Nov. 29, 1938.    A. HORAK    2,138,168
AERIAL ROCKET
Filed May 18, 1936
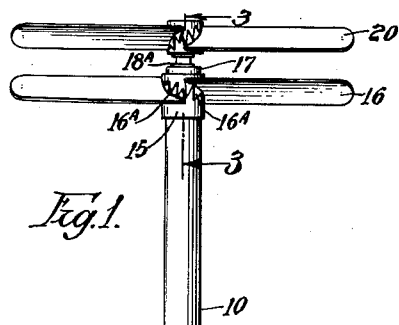
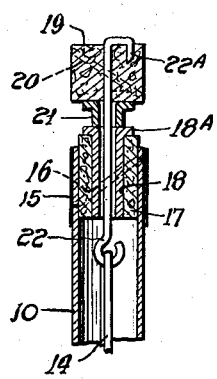
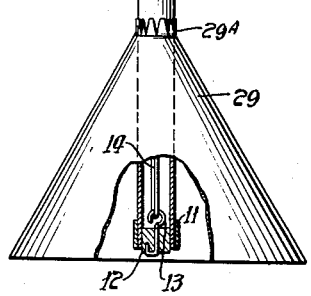
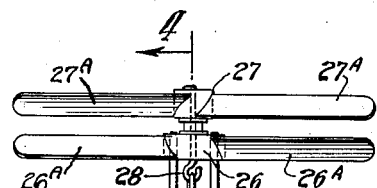
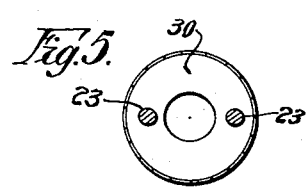
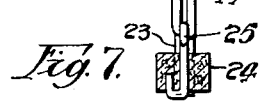
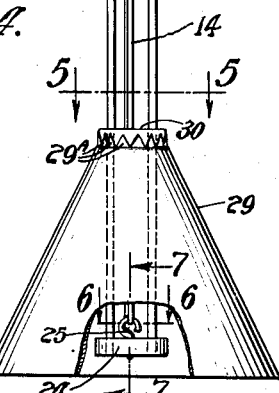
Inventor:
Anton Horak,
By: Frank J. Shraeder Jr
Attorney.

Patented Nov. 29, 1938

2,138,168

UNITED STATES PATENT OFFICE 2,138,168

AERIAL ROCKET

Anton Horak, Chicago, Ill.

Application May 18, 1936, Serial No. 80,359

10 Claims. (Cl. 46—75)

This invention relates generally to aircraft and has particular reference to new and useful improvements in toy aerial rockets.

One of the objects of my invention resides in the provision of a toy rocket which is characterized by a simple and inexpensively constructed structure which is adapted to be manufactured from various materials such as paper, cardboard, fiber board, wood or even light sheet metal.

Another object of my invention is found in the construction of a toy rocket of a channeled support or a body of tubular material such as paper, cardboard or fiber board, or other suitable material, having two propellers, one mounted stationary relatively to the body and the other propeller being mounted relatively movable to the stationary propeller and rocket body; the movable propeller having a connection with one end of a rubber band, or a plurality of rubber bands, the other end of which rubber band is secured to the opposite end of the tubular rocket body. The arrangement of the elements being such that the movably mounted propeller can be rotated to twist the elongated rubber band to impart a tension to same so that when the movably mounted propeller is released the unwinding action of the rubber band will cause the movable propeller to be rotated in one direction and the body and the propeller fixed thereto in the opposite direction to cause the rocket to be projected into aerial flight; the blades of the one propeller being oppositely pitched to those of the other propeller.

Still another object of the invention resides in the provision of a conical body attached to the rocket body near its rear end. This conical body tends to guide the movement of the rocket body, balances the rocket body, forms a support for the rocket preliminary to its release for flight and further reverses the position of the rocket at the end of its flight so that the rocket is brought down by gravity head first in a substantially vertical drop to thereby cause the rocket to engage the landing ground with the hub of the movably mounted propeller.

A further object of my invention finds embodiment in constructing the body of the rocket of a pair of elongated members preferably of circular cross-section of light-weight wood or other suitable material and in providing a plurality of cross-members for retaining the elongated members; one of said cross-members being mounted at the front or propeller end and having a pair of propeller blades fixed thereto, another of such cross-members being mounted at the rear end of the elongated members to support one end of the propelling rubber band, and another of such cross-members being mounted intermediate the ends of the elongated members, preferably closer to the rear end of the rocket, to form a support for the balancing and guiding conical body.

With the above and other objects in view, my invention consists in the novel combination, construction and arrangement of the parts and members of the rocket shown in preferred embodiments in the attached drawing, described in the following specification, and particularly pointed out in the appended claims.

In the drawing:

Fig. 1 is a side elevation of a rocket embodying my invention; a part of the figure being broken away to show the construction;

Fig. 2 is a side elevation of a modified form of rocket embodying my invention;

Fig. 3 is an enlarged vertical section taken on line 3—3 of Fig. 1;

Fig. 4 is an enlarged vertical section taken on line 4—4 of Fig. 2;

Fig. 5 is a cross-section taken on line 5—5 of Fig. 2;

Fig. 6 is a cross-section taken on line 6—6 of Fig. 2; and

Fig. 7 is a vertical section taken on line 7—7 of Fig. 2.

The rocket shown in Figs. 1 and 3, includes an elongated tubular body 10 of light-weight material, preferably paper or cardboard tubing reenforced at its rear end with a circular paper band 11, and provided therein with a cylindrical tapered plug or support 12 of cork or wood having a hooked connection 13 of wire secured thereto to support one end of the propelling rubber band or bands 14.

The opposite or upper end of the tubular body 10 is also preferably reenforced with a paper band 15 to which I glue, or otherwise secure, the two propeller blades 16, each blade being of fiber or other suitable light but stiff material formed at the hub end with two sets of reversely bent series of V-shaped cuts 16A which are adapted to be glued to the outside of the reenforcing band 15.

A plug of cork or wood 17 is pressed into the forward or front end of the tubular body 10 and the plug 17 is provided with a longitudinal passage preferably defined by a tubular metallic sleeve 18 having a flanged integral bearing 18A.

The relatively movably mounted propeller consists of a hub 19 of cork or wood with blades 20 of fiber board, similar in construction to blades 16, glued to the hub 19.

Obviously this propeller could be made of wood or other material of one piece and the blades formed integrally with the hub 19.

Between the hub 19 and the top of the plug 17 and its flange 18A, I interpose a tubular flanged metallic bearing 21 to provide metallic contacting surfaces to reduce the friction between such relatively movable parts and to prolong their wear.

Obviously, element 21 could be made in two parts as a double washer or other suitable frictionless bearings could be substituted to take up the relatively small friction between the relatively movable propeller parts.

The hub 19 is provided with a wire connection 22 adapted to receive the upper end of the propelling rubber band or bands 14. It will be noted that the connector 22 extends from the propeller hub 19 through the tubular members 21 and 18 for free rotation therein and that the outer end of the connector 22 is bent inwardly into the outer end of the hub 19, as at 22A, to securely fasten the connector 22 to the hub 19 to cause a rotation of the hub 19 with the connector 22 during winding and unwinding of the propelling rubber band 14.

In the modified form of rocket embodying my invention as illustrated in Figs. 2, 4, 5, 6 and 7, the elongated rocket body consists of a pair of spaced elongated body members 23, preferably of wood of round cross-section extended at the rear end of the rocket into a transversely disposed oblong block 24 having secured centrally thereto a hook 25 of wire or of other suitable material or form adapted to support one end of the rubber band or bands 14.

At the upper or forward end of the rocket, the spaced elongated body members 23 are secured within the oblong wooden hub 26 having integral and oppositely disposed propeller blades 26A.

An independently rotatable propeller comprising a hub 27 and integral blades 27A is mounted for relative opposite movement to that of the blades 26A.

In both designs, illustrated by Figs. 1 and 2, the blades of one propeller are oppositely pitched to those of the other propeller since the unwinding rubber band 14 will impart reverse rotations to the two propellers.

In the form of the rocket shown in Fig. 2 the propeller hub 27 has fixed thereto a connector 28 of wire which extends through the tubular sleeve bearings 21 and 18 and which is hooked at its lower end to support the upper end of the rubber band 14.

In both of the designs the rubber propelling bands 14 are normally of a length to be sufficiently tensioned to retain the outer movable propeller and the bearings 21 and 18 in face contact with one another.

Both forms of rockets are provided preferably near their rear or lower ends with a conical member 29 of preferably stiff light-weight paper and of suitable design to form a flight directing guide and a balancing member for the rocket. In the type of rocket shown in Fig. 1 the conical member is formed, near its apex, with a plurality of V-shaped extensions 29A adapted to be bent around and attached by glue to the tubular member 10, whereas, in the type of rocket shown in Fig. 2 the V-shaped extensions 29A are glued to the exterior face of the intermediate circular cross-member 30 which also constitutes an intermediate cross support for the elongated member 23 which preferably extends through the body of the cross-member 30.

It is obvious that various modifications and changes may be made in the details of construction without departing from the spirit of my invention as defined in the appended claims.

I claim:

1. A toy aerial rocket comprising an elongated body, a plurality of propeller blades fixed to the upper end of said body, a second propeller mounted on the upper end of said body for rotation independent of and reverse in direction to that of said body and its attached propeller blades, an elongated rubber band having one end attached to the hub of said second propeller and its other end attached to said elongated body, and a conical body at the lower end of said elongated body.

2. A toy aerial rocket comprising an elongated tubular body, a plurality of propeller blades fixed to the upper end of said body, a second propeller mounted on the upper end of said body for rotation independent of and reverse in direction to that of said body and its attached propeller blades, an elongated rubber band extending within said tubular body and having one end attached to the hub of said second propeller and its other end attached to said elongated body, and a hollow conical body at the lower end of said elongated body.

3. In a toy aerial rocket as embodied in claim 1, and including said conical body formed of a thin wall of frusto-conical shape having an integral portion near the apex thereof attached to an intermediate portion on said elongated body and the base of said frusto-conical body extending substantially to the lower end of said elongated body.

4. In a toy aerial rocket as embodied in claim 2, and including said conical body formed of a thin wall of frusto-conical shape having an integral portion near the apex thereof attached to the wall of said tubular body and the base of said frusto-conical body extending substantially to a plane near the lower end of said body, and the blades of said second propeller having a pitch reverse to that of the blades fixed to said tubular body.

5. An aerial rocket adapted for substantially vertical flight comprising an elongated body, a plurality of propeller blades fixed to one end of said elongated body, a second propeller having a hub and a plurality of propeller blades pitched reversely to the pitch of the blades fixed to said elongated body, said second propeller being mounted near the propeller blades on said elongated body and being independently rotatable of said elongated body, power means mounted within the side limits of said elongated body and having operative connections with said elongated body and said second propeller and adapted to rotate said second propeller reversely to the rotation of the elongated body and its attached propeller blades, and flared means connected to said body disposed outwardly and rearwardly symmetrically of the longitudinal axis of said body for guiding and balancing said body in its flight.

6. A toy aerial rocket comprising an elongated tubular body, a plug frictionally mounted within one end of said tubular body and having a passage extending through said plug parallelly to the longitudinal axis of said tubular body, a plurality of propeller blades fixed to said end of said tubular body, a second propeller mounted on said end of said tubular body but outwardly beyond said blades of said tubular body, annular bearings mounted between the adjacent faces of said plug and the hub of said second propeller, an elongated connector extending from the hub of said second propeller through said bearings and said plug passage to within the tubular body, a second plug frictionally mounted within the opposite end of said tubular body, a connector fixed to said second plug, an elongated rubber band mounted within said tubular body and having its opposite ends connected to said connectors, and a hollow frustoconical body secured near its apex to an intermediate portion of said tubular body, the blades of said second propeller being pitched reversely to the blades of said tubular body and the manual rotation of said second propeller being adapted to impart a longitudinal twist to said rubber band which when released will, through the untwisting action of said rubber band, cause said second propeller to be revolved in a direction opposite to the rotation of said tubular body and its attached propeller blades.

7. A toy aerial rocket adapted for power-propelled vertical flight and bodily reversible in its gravity descent and comprising an elongated body having a propeller fixed to said body, a second propeller mounted above the forward end of said body for rotation reverse in direction to that of said body and its said propeller, a flexible member extending within and longitudinally of said body and having one end operatively connected to said second propeller and its other end connected to said body, and means balancing said body in vertical position during its upward and downward flights.

8. A toy aerial rocket as embodied in claim 7 and including said means comprising said body having a rearwardly flaring conical wall.

9. A toy aerial rocket adapted for power-propelled vertical flight and bodily reversible in its gravity descent and comprising an elongated body having a propeller fixed to said body, a second propeller mounted above the forward end of said body for rotation reverse in direction to that of said body and its said propeller, a flexible member having one end operatively connected to said second propeller and its other end connected to said body, and means comprising a rearwardly flaring conical wall for balancing said body and tending to maintain said body in substantially vertical position during its power-propelled and gravity flights.

10. A toy aerial rocket adapted for power-propelled vertical flight and bodily reversible in its gravity descent and including a body comprising a plurality of elongated members, cross-members connecting said elongated members at their upper and lower ends, the cross-member at the upper end constituting a support for air-engaging means fixed to said support and disposed angularly to the longitudinal axis of the body, a propeller mounted on the forward end of said body for rotation independent of and reverse in direction to that of said body, an intermediate cross-member embracing said elongated members, power-imparting means supported on said body and connected to said propeller adapted for imparting rotation to said propeller, and means below said propeller connected to said intermediate member tending to maintain said body in substantially vertical position during its upward and downward flights.

ANTON HORAK.